United States Patent [19]
Cordle et al.

[11] Patent Number: 5,837,312
[45] Date of Patent: Nov. 17, 1998

[54] DEBITTERED PROTEIN PRODUCT HAVING IMPROVED ANTIGENICITY AND METHOD FOR MANUFACTURE

[75] Inventors: Christopher T. Cordle, Centerburg, Ohio; Shih-Bin Lin, Central, S.C.; Lynn P. Nelles, Westerville, Ohio; Ronald L. Thomas, Clemson, S.C.

[73] Assignee: Abbott Laboratories, Abbott Park, Ill.

[21] Appl. No.: 717,004

[22] Filed: Sep. 20, 1996

[51] Int. Cl.[6] .............................. A23L 1/00; A23P 1/00; A23J 1/00; C07C 227/00

[52] U.S. Cl. ........................ 426/656; 426/478; 426/665; 561/516

[58] Field of Search ................................... 426/656, 388, 426/478, 330, 330.5, 533, 333, 335, 544, 665; 424/184.1; 162/164.4; 507/127; 562/576; 252/315.6; 556/450, 453, 456

[56] References Cited

U.S. PATENT DOCUMENTS

| | | |
|---|---|---|
| 4,075,195 | 2/1978 | Roland et al. ........................ 260/119 |
| 5,087,469 | 2/1992 | Acree ................................... 426/544 |
| 5,547,687 | 8/1996 | Outinen et al. ........................ 426/2 |

OTHER PUBLICATIONS

McGraw–Hill Dictionary of Chemical Terms, Sybil P. Parker, New York, p. 386, 1992.
Roland et al (B), J. Food Science 43(5): 1491–1493, 1978.
Supelco, "Lorumn Selection," In: Supelco Chroma–tography Products, 1994, pp. 120–121.
Outiron et al. Kemia–Verm: 19 (9/10):823–826, 1992 *English Abstract Only.
Fujimaki et al., *Agric. Biol. Chem.* 34: 1325–1332 (1970).
Matoba et al., in *Agric. Biol. Chem.* 34:1235–1243 (1970).
Noguchi et al., *J. Food Sci.* 40:367–369 (1975).
Arai, "The Bitter Flavor Due To Peptides Or Protein Hydrolysates And Its Control By Bitterness–Masking With Acidic Oligopeptides" in *The Analysis and Control of Less Desirable Flavors in Foods and Beverages*, pp. 133–147 (1980).
Tamura et al., *Agric. Biol. Chem.*, 54:41–51 (1990).
Fujimaki et al., *J. Food Sci.* 35:25–218 (1970).
Fujimaki et al., *Agric. Biol. Chem.* 34:483–484 (1970).
Fujimaki et al., *J. Appl. Bacteriol.* 34:119–131 (1971).
Yamashita et al., *Agric. Biol. Chem.* 34:1484–1491 (1970).
Yamashita et al., *Agric. Biol. Chem.* 34: 1492–1500 (1970).
Eriksen et al., *J. Food Sci.* 41:490–493 (1976).
Arai et al., *J. Food Sci.* 35:392–395 (1970).
Umetsu et al., *J. Agric. Food Chem.* 31:50–53, (1983).
Minagawa et al., *J. Food Sci.* 54:1225–1229 (1989).
Tan et al., *Appl. and Environ. Microbiol,* 59:1430–1436 (1993).
Roland et al., *J. Food Sci.* 43:1491–1493 (1978).
Adler–Nissen, "Enzymic Hydrolysis of Food Proteins", *Methods in Food Protein Hydrolysis* (1986).
Ney, *Food Taste Chemistry ACS, Symp.* Ser. 115:149–173 (1979).
Moore et al., "Chromatographic Determination of Amino Acids by the Use of Automatic Recording Equipment" in *Methods of Enzymology*, 6:819–831 (1963).
Mahmoud et al., *J. Food Sci.* 57:1223–1229 (1992).
Moore, *J. Biol. Chem.,* 238:235–237 (1963).
Hugli et al., *J. Biol. Chem.,* 247:2828–2834 (1972).

*Primary Examiner*—Marian C. Knode
*Assistant Examiner*—Jay F. Williams
*Attorney, Agent, or Firm*—Thomas D. Brainard; J. Michael Dixon

[57] ABSTRACT

A method for debittering and reducing the allergenic reactivity of protein hydrolysates is disclosed, which method includes the providing of an aqueous solution of a protein hydrolysate, feeding the solution into a bed of siloxane, and collecting a first portion of the solution exiting from the bed. The first portion contains either a non-bitter or bitter fraction. A second portion of the solution exiting from the bed can be collected which contains the opposite tasting fraction of the hydrolysate. Preferably the siloxane is selected from the group comprising octa-siloxane and octadecyl-siloxane. Preferably the hydrolysate has a molecular weight of less than 10,000, and is derived from the group of hydrolysates comprising casein, whey and soy. Additionally, the bed preferably is of a depth of between 2 to 4 times the bed diameter. A more hypoallergenic protein hydrolysate product produced in accordance with the method of the invention is also disclosed.

21 Claims, 6 Drawing Sheets

1

DEBITTERED PROTEIN PRODUCT HAVING IMPROVED ANTIGENICITY AND METHOD FOR MANUFACTURE

TECHNICAL FIELD

The present invention relates generally to the treatment of protein hydrolysates, and more particularly to a method of treating protein hydrolysates using a siloxane adsorption column to recover a debittered fraction which additionally is characterized by lowered antigenicity and decreased allergenic reactivity.

BACKGROUND ART

Food allergies to various proteins, such as casein, whey, soy and meat protein are well-known. One area in which these food allergies are readily apparent concerns infants who exhibit milk protein allergy. Some babies adversely react to the presence of milk protein, whether it comes in the form of casein or whey protein. In other cases, infants develop allergies to soy protein, and some develop allergies to a combination of milk protein and soy. The problem with food allergies to various proteins is not limited to infants. It is not uncommon for adults later in life to develop food allergies.

Food allergies in individuals are usually limited to one or a small number of foods. These allergies can be controlled by avoiding the specific food. For individuals with wider allergic reactivity, and especially for infants who are allergic to both milk and soy protein, avoidance is not practical.

The solution to these problems is enabling the highly sensitive individual to have a diet in which the proteins have been broken down, digested or hydrolyzed. Extensive research has resulted in the availability of a wide variety of hydrolyzed protein products. Although the providing of foods, either in solid or liquid form, with protein hydrolysates permits these individuals to have a more normal diet, a significant problem still exists, and that is due to a characteristic of protein hydrolysates: they are bitter.

The bitter flavor of extensively hydrolyzed protein has been and continues to be a major hindrance for its utilization in the food and nutritional beverage industry. The cause for the bitterness was identified as early as 1970 by Fujimaki et al in *Agric. Biol. Chem.* 34: 1325–1332 (1970) and Matoba et al in *Agric. Biol. Chem.* 34: 1235–1243 (1970) as being the presence in the protein hydrolysate of specific peptides, which peptides exhibit a bitter flavor.

Attempts at addressing the bitterness problem have utilized several approaches. (One approach has been to try to mask the bitter flavor with palatable flavorings. Noguchi et al, *J. Food Sci.* 40: 367–369 (1975), Arai, "The Bitter Flavor Due To Peptides Or Protein Hydrolysates And Its Control By Bitterness-Masking With Acidic Oligopeptides" in *The Analysis and Control of Less-desirable Flavors in Foods and Beverages*, p. 133–147 (1980), and Tamura et al, *Agric. Biol. Chem.*, 54: 41–51 (1990). This approach has met with limited success. Plus, the masking increases the cost of the food product. Another approach has been the formation of plastein. Fujimaki et al, *J. Food Sci.* 35: 215–218 (1970), Fujimaki et al *Agric. Biol. Chem.* 34: 483–484 (1970), Fujimaki et al, *J. Appl. Bacteriol.* 34: 119–131 (1971), Yamashita et al, *Agric. Biol. Chem.* 34: 1484–1491 (1970), and Yamashita et al, *Agric. Biol. Chem.* 34: 1492–1500 (1970). However, under certain conditions the formation of plastein for debittering may produce toxic substances thus limiting its application in the food industry. Eriksen et al., *J. Food Sci.* 41: 490–493 (1976).

Still another approach has been the release of hydrophobic amino acids from bitter peptides by exopeptidases, such as wheat carboxypeptidases and aminopeptidases. Arai et al, *J. Food Sci.* 35: 392–395 (1970), Umetsu et al., *J. Agric. Food Chem.* 31: 50–53, (1983), Minagawa et al., *J. Food Sci.* 54: 1225–1229 (1989), and Tan et al., *Appl. and Environ. Microbiol.* 59: 1430–1436 (1993). However, these methods have certain limitations, since such enzymes produce significant amounts of free amino acids that may affect food quality. Additionally, the inactivation of enzymes after processing increases cost.

Yet another approach has been adsorption. Typically, most adsorptive debittering methods are costly, time consuming, complicated, or have low capacity to produce desired non-bitter hydrolysates. One such approach is documented in Roland et al, *J. Food Sci.* 43: 1491–1493 (1978) and Roland, U.S. Pat. No. 4,075,195. The Roland approach involves the passing of a protein hydrolysate solution through a bed of phenolic resin particles. The Roland article states that the debittered hydrolysates were found compatible in foods and beverages where a beefy broth character was desirable. Additionally, the nonbitter product was low in phenylalanine with potential application in the dietary management of phenylketonuria (PKU).

Another adsorptive debittering method attempted to improve the flavor of hydrolysates by reducing the hydrophobic peptide and amino acid content of the digests through the use of activated carbon. For example, it has been known that activated carbon absorbs tryptophan, tyrosine, and phenylalanine. However, the utilization of activated carbon in this way has been limited primarily to laboratory-scale use. Furthermore, activated carbon used in this way is not regeneratable. This fact presents the potential for environmental problems related to the cleaning or disposal of the used activated carbon.

Thus preexisting attempts at debittering have been limited in their application, have exhibited flavor that was unacceptable even though the hydrolysate technically had its bitterness reduced, or have not been commercially efficient. For example, the yields associated with the phenolic resin process of Roland are in the 40–50% range. In the food industry, for a process to be commercially viable, the efficiency of the process has to be at least in the 70–80% range.

It is thus apparent that the need exists for a method of treating hydrolyzed protein to recover a debittered fraction. Furthermore, it should be appreciated that the need exists for a method of treating hydrolyzed protein to recover, at high yield, a debittered fraction, which method results in a debittered fraction having minimal alteration of nutritional value.

DISCLOSURE OF THE INVENTION

There is disclosed a method for debittering protein hydrolysates with the original protein hydrolysate comprising a bitter fraction and a non-bitter fraction, which method comprises providing an aqueous solution of an original protein hydrolysate sufficiently hydrolyzed so as to exhibit bitterness, feeding the solution into a bed of siloxane, and collecting a first portion of the solution exiting from the bed which contains one of the fractions. Additionally, the other fraction may be collected as a second portion, but the descriptors first and second merely identify the portions and are not intended necessarily to correspond to the order of collection from the siloxane bed.

Preferably the form of siloxane is octadecyl-siloxane. In another embodiment of the invention the form of siloxane is octa-siloxane. The original protein hydrolysate may be derived from animal protein such as casein or whey, or from vegetable protein such as soy. The method of this invention produces a debittered protein hydrolysate which also has a lower antigenicity and allergenic reactivity than the original protein hydrolysate.

There is also disclosed a debittered protein hydrolysate product produced in accordance with the aforementioned process. Once again, the original protein hydrolysate may be derived from any protein source including, but not limited to animal protein such as casein or whey, or vegetable protein such as soy. The debittered protein hydrolysate product also has a lower allergenic reactivity than the original protein hydrolysate.

A nutritional product in accordance with the invention further comprises a source of fats and a source of carbohydrates in addition to the debittered protein hydrolysate. Sources of such fats and carbohydrates are already well known to those skilled in the art of nutrition and need not be detailed here.

There is also disclosed a method for decreasing the allergenic reactivity of protein hydrolysates, which method comprises the steps of providing an aqueous solution of an original protein hydrolysate, feeding the solution into a bed of siloxane, and collecting a first portion of said solution exiting from the bed, with the first portion having a lower allergenic reactivity than the original protein hydrolysate.

Once again, although any siloxane could be used, preferably the form of siloxane is octadecyl-siloxane. In another embodiment of the invention the form of siloxane is octa-siloxane. The original protein hydrolysate may be derived from animal protein such as casein or whey, or from vegetable protein such as soy.

One aspect of this invention is to provide a method for treating hydrolyzed protein to separate a non-bitter fraction therefrom, and to provide a non-bitter product from hydrolyzed protein.

Still another aspect of this invention is to provide a method for treating hydrolyzed protein to separate a debittered fraction having minimal alteration of nutritional value.

Still another aspect of this invention is to provide a method for treating hydrolyzed protein to decrease the antigenicity and/or allergenic reactivity thereof.

Yet still another aspect of this invention is to provide a method for treating hydrolyzed protein to separate a debittered fraction, which method is efficient enough so as to be commercially viable.

Still yet another aspect of this invention is to provide a method for treating hydrolyzed protein wherein the type of hydrolysis utilized in obtaining the hydrolyzed protein is not important.

Other aspects and advantages of the instant invention will be appreciated from the following description, drawings, examples, and the appended claims.

DETAILED DESCRIPTION OF THE INVENTION

Figure 1A:
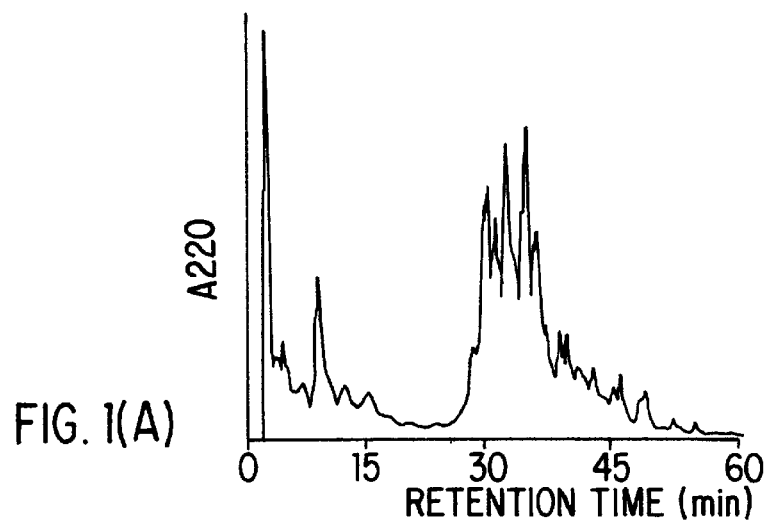
FIG. 1 shows the RP-HPLC profiles of a protein hydrolysate, 2216-S, debittered using C18, the debittered fraction and the bitter fraction.

Specifically, the present invention is concerned with a method for debittering protein hydrolysates, and the production of a protein hydrolysate using that method. The protein hydrolysate may be derived from any protein source including, but not limited to animal protein such as casein or whey, or vegetable protein such as soy. With respect to the present invention, the degree of hydrolysis is not believed to be critical with regard to either the duration of the hydrolytic process or the nature of the hydrolytic agent. It will be understood by those skilled in the art that the specific protein(s) the hydrolytic agent and the duration of hydrolysis all affect the degree of hydrolysis but the invention is useful whenever the hydrolysis process releases enough bitter peptides so that the protein hydrolysate exhibits bitterness. Bitterness may be assessed by any of several known methods, including the Q-value and sensory tests described below. Preferably the degree of hydrolysis results in a hydrolysate having a molecular weight less than 10,000 Daltons.

It will also be appreciated that the nature of the hydrolytic agent is not crucial, provided bitter peptides are released. For example, hydrolysis of the original protein may be effected by acid, base, pure enzymes, mixtures of pure enzymes, and enzyme extracts, depending on the circumstances.

Additionally, the present invention is concerned with a method for debittering protein hydrolysates in which the debittered protein hydrolysate has a lower antigenicity and allergenic, reactivity than the original protein hydrolysate. The desirable results associated with this invention were obtained through the use of a siloxane chromatographic system.

Siloxane $(R_2SiO)_n$ refers to an analytical separation media. Siloxane is commonly used in analytical chromatography. Octadecyl-siloxane (C18) and octa-siloxane (C8) are used herein merely because they are readily available forms of siloxane. Siloxanes having other chain lengths in the alkyl portion, especially those greater than C8, would be expected to be useful in the invention. Siloxane has been used previously in analytical applications to separate peptides from aqueous solutions. Suggested separations also include drug and drug metabolites in serum and urine, peptides in biological fluids, organic acids in wine and beverages, and desalting of peptides and oligonucleotides. However there has been no suggestion as to its use to separate an entire class of compounds, specifically bitter from non-bitter protein hydrolysates. Nor has there been any suggestion that siloxanes can be used to reduce the allergenic reactivity of hydrolysates.

With respect to peptides, the C18 or C8 separation techniques, as they are known, have been viewed analytically as a continual separation useful for separating individual peptides from one another. In the analytical process certain solvents are used in multiple phases or gradients, like in chromatography, to separate the components. For example, an analytical chromatogram from a technique such as high-performance liquid chromatography (HPLC), may disclose literally hundreds of peptides separating from each other. Once separated by a continuous separation, the individual peptide components can be identified and measured.

By contrast, the method and product associated with the instant invention are related to the complete absorption of the bitter peptides using this novel approach to debittering. To best appreciate the invention, the use of siloxane, specifically C18 and C8, was compared with the phenolic resin (PR) of Roland. As such, the performances of three different chromatographic systems, C18, C8 and PR were evaluated for debittering casein hydrolysates.

For the siloxane chromatographic systems, commercial C18 and C8 Sep-Pak columns (12.5 cm×2.5 cm) containing 10 g of packing material with a total volume of 35 ml, were purchased from Waters (Millipore Corporation, Milford, Mass.), although other sizes could be used. Preferably the capacity of the process column is 0.5–0.8 g of hydrolysate per gram of siloxane. Additionally, the bed depth is approximately 2–4 times the column diameter. Before debittering the hydrolysates, the columns with a hold-up volume of 16.8 ml were washed with 100 ml of absolute ethanol, followed by washing with 100 ml of deionized water. Downflow columns were used, although this is not deemed critical. During the washing at room temperature, vacuum was used as the driving force.

Following washing, a 100 ml hydrolysate sample was applied to the inlet of the column. It passed through the column, followed by 25 ml of deionized water, although a buffer solution, an aqueous solution of a polar solvent or just water could be used. Vacuum was used as the driving force. The effluent (125 ml), having a flow rate of 2–6 ml per minute per gram of siloxane was collected as the debittered fraction. The siloxane columns were then able to be regenerated with 100 ml of absolute ethanol, although another non-polar solvent could be used, with the second effluent collected as the bitter fraction. The debittered and bitter fractions were thereafter freeze-dried for later analysis. Six hold up volumes of ethanol followed by six hold up volumes of water were then used to clean the column before the beginning of the next cycle.

For the phenolic resin chromatographic system, the phenolic resin column was prepared by packing prehydrated Cuolite S-761 resin (Supelco, Inc., Bellefonte, Pa.) into aLKB2137 chromatography column (LKB, Bromma, Sweden) (2.5×75 cm) and processed as described by the Roland article (i.e., *J. Food Sci.*, 43: 1491–1493 (1978)). The resin was washed with 2-bed volumes of 2% (v/v) NaOH, then rinsed with 2-bed volumes of deionized water followed by 3-bed volumes of 1% (v/v) HCl, and then finally rinsed with additional deionized water until the pH of the effluent was 5.5.

Following washing, a 500 ml hydrolysate sample was applied to the inlet of the column. It passed through the resin bed at room temperature at a flow rate of 28 ml per minute, monitored by an absorbance detector (LKB) at 280 nm. Meanwhile, it should be remembered that there is no need for monitoring of the siloxane column by an absorbance detector, since there is a clearly defined end point of the debittering.

The portion before the appearance of the highest peak was collected as the nonbitter faction and the later portion contained in the second peak was collected as the bitter faction. Compared with the siloxane process, it will readily be appreciated that the PR method is more cumbersome, and that there is not a clear end point to establish when the debittering is complete. The debittered and bitter fractions were thereafter freeze-dried for later analysis. The PR column was regenerated with water until base line absorbance was obtained.

All documents and references cited anywhere in this specification are incorporated herein in their entirety.

The invention will be better understood in view of the following examples which are illustrative only and should not be construed as limiting the claims of invention.

EXAMPLE 1—DEGREE OF HYDROLYSIS

DH is a measurement of the degree of hydrolysis defined as the percentage of broken peptide bonds to total peptide bonds of each original hydrolysate measured by the pH stat and trinitrobenzenylsulfonic acid (TNBS) method described by Adler-Nissen, "Enzymic Hydrolysis of Food Proteins", *Methods in Food Protein Hydrolysis* (1986). The DH values for the original protein hydrolysates are set forth in Table I. While the degree of hydrolysis, DH, can be difficult to calculate, an estimate of the degree of hydrolysis can be readily calculated using the formula:

$$A_N/T_N$$

where $A_N$ corresponds to the total amino nitrogen content of the hydrolysate and $T_N$ corresponds to the total nitrogen content of the hydrolysate. However, it should be appreciated that this formula is only an approximation of the degree of hydrolysis and is not actually the value for the degree of hydrolysis, due to the presence of amino nitrogen on the side chains of some amino acids.

Three protein hydrolysates were used in the tests associated with this invention. The first was a casein hydrolysate designated as ACH2. It was the product of a two-stage membrane system using the proteolytic enzyme NOVO Alcalase. In order to exclude the effect of salt in taste analysis, the hydrolytic process was performed without adding salt. The other two hydrolysates used to evaluate this invention were hypoallergenic casein hydrolysates designated as 2216 and 2216-S (Ross Products Division of Abbott Laboratories, Columbus, Ohio). All of the hydrolysates were dissolved at a concentration of 4% in deionized water (based on a total nitrogen content of N×6.38). Each hydrolysate solution was then adjusted to a pH of 7.0 using 2 N NaOH or 2 N HCl.

As can be appreciated from Table 1, both 2216 and 2216-S were highly hydrolyzed. 2216 contained 52.9% free amino acid and had a DH of 65.5%, while 2216-S contained 19.6% free amino acid and had a DH of 47%. The membrane reactor product, ACH2, was less hydrolyzed and had less than 5% free amino acid and a DH of 23%. The yields and flow rate in the debittering process were found to be related to the DH of the starting material. Higher DH values corresponded to a higher yield as well as a better flow rate, both of which translate into a more commercially viable process.

EXAMPLE 2—SENSORY EVALUATION

The six freeze-dried hydrolysate samples were reconstituted to 3% for ACH2 and 5% for 2216-S and 2216 in water purchased from Carolina Mountain Water (Cashiers, N.C.). Six trained taste panelists were selected based on their sensitivity to bitterness and their ability to detect bitterness differences in triangular tests with variant concentrations of caffeine solutions. All taste panel evaluations took place in a uniform, well-lighted room equipped with individual booths for the panelists. After rinsing the mouth, a spoonful (about 3.5 ml) of sample was kept in the mouth for 10 seconds and then expectorated, whereupon the degree of bitterness was determined.

The strength of bitterness was evaluated using a 6 point scale. Caffeine solutions were used as the bitterness standards as follows: 0—not bitter; 1—trace of bitterness (0.025%); 2—slightly bitter (0.05%); 3—bitter (0.1%); 4—very bitter (0.2%); 5—extremely bitter (0.3%). The data from the scoring tests were treated by ANOVAS using the SAS program (v. 6.07).

TABLE I

Characteristics of debittering columns and protein hydrolysates

| | ACH2 | | | 2216-S | | | 2216 | | |
|---|---|---|---|---|---|---|---|---|---|
| Characteristics | Ori[a] | DB[a] | B[a] | Ori | DB | B | Ori | DB | B |
| Free AA % | | | | | | | | | |
| C18[b] | —[c] | — | — | 19.6 | 22.6 | — | 52.9 | 58.9 | — |
| C8[b] | — | — | — | 19.6 | 16.6 | — | 52.9 | 44.3 | — |
| PR[b] | — | — | — | 19.6 | 21.3 | — | 52.9 | NA[d] | NA |
| DH (%) | 23 | NA | NA | 47 | NA | NA | 65.5 | NA | NA |
| Flow Rate (ml/min) | | | | | | | | | |
| C18 | | 33.3[e] | | | 32.6 | | | 33.6 | |
| C8 | | 55.0[e] | | | 47.8 | | | 50.5 | |
| PR | | 28.0 | | | 28.0 | | | NA | |
| Yield % | | | | | | | | | |
| C18 | | 78.0 | | | 84.0 | | | 90.5 | |
| C8 | | 88.8 | | | 93.3 | | | 95.6 | |
| PR | | 41.4 | | | 45.0 | | | NA | |
| Q-Value | | | | | | | | | |
| C18 | 1417 | 1240 | 1795 | 1360 | 1200 | 1800 | 1262 | 1190 | 1618 |
| C8 | 1417 | 1383 | 1819 | 1360 | 1313 | 1863 | 1262 | 1239 | 1618 |
| PR | 1417 | 1184 | NA | 1360 | 1195 | NA | 1262 | NA | NA |
| Sensory Test[f] | | | | | | | | | |
| C18 | 4.1 | 0.2 | >5 | 2.7 | 0.5 | >5 | 1.6 | 0.6 | >5 |
| C8 | 4.1 | 3.6 | >5 | 2.7 | 1.7 | >5 | 1.6 | 0.7 | >5 |
| PR | 4.1 | 0.2 | NA | 2.7 | 0.8 | NA | 1.6 | NA | NA |

[a]Ori = Original Hydrolysate; DB = Debittered hydrolysate; B = Bitter hydrolysate.
[b]C18 and C8 are the Sep-Pak columns; PR is the phenolic resin column.
[c]Less than 5.
[d]Not available
[e]Flow rate decreased by 40% after 10 trials.
[f]ACH2 was tasted at 3%: 2216-S and 2216 were tasted at 5%.
The significant level in sensory test: $p < 0.01$.

Prior to debittering, the taste of ACH2 (3%) was reported as very to extremely bitter, 2216-S (5%) was bitter and brothy, and 2216 (5%) was ranked slightly bitter but brothy, scorched, burnt and sour. These results were consistent with the previous finding by other researchers that bitterness increased as DH increased.

The debittered products from ACH2, 2216-S and 2216 by C18 and PR columns were non-bitter. Thus, this invention provides a way of processing a protein hydrolysate so that people would say it no longer tastes bitter. More importantly, the C18 scores specifically were either as low or lower than the phenolic resin scores for all of the sensory tests. It should be noted that the C8 column was unable to completely remove bitterness from the original hydrolysates here tested. Additionally, other unpalatable flavors of 2216-S and 2216 were also improved by the debittering columns, although once again, the C8 columns had less effect than the C18 and PR columns. Although C8 and C18 forms of siloxane were used due to their commercial availability, the test results indicate that the longer the chain, the better. Thus, for example, it is believed that use of the C24 form of siloxane would give better results, however this particular form is not readily commercially available. Also, it is believed that the selection of a siloxane chain of an intermediate length between C8 and C18 would give results in between those associated with C8 and C18.

The term Q-value, as this term is described by Ney, *Food Taste Chemistry. ACS Symp. Ser.* 115: 149–173 (1979), is used to qualitatively determine the bitterness of a protein hydrolysate. The equation used to measure the Q-value is:

$$Q = \frac{\Sigma \Delta f}{n}$$

where Q represents the average hydrophobicity of the given peptide; f is the value of a single amino acid determined according to Table II set forth below representing a measure of the hydrophobicity of an amino acid residue; and n is the number of amino acid residues in the given peptide. Q-value is calculated as the average value of the mixture of peptides in the protein hydrolysates. The Q-values associated with this invention are set forth above in Table I.

TABLE II

The relative hydrophobicity of individual amino acid residues

| Amino Acids | f in cal/mole (25° C.) |
|---|---|
| GLY | 0 |
| SER | 40 |
| THRE | 440 |
| HIS | 500 |
| ASP | 540 |
| GLU | 550 |
| ALA | 730 |
| ARG | 730 |
| METH | 1300 |
| LYS | 1500 |
| VAL | 1690 |
| LEU | 2420 |
| PRO | 2620 |

TABLE II-continued

The relative hydrophobicity of individual amino acid residues

| Amino Acids | f in cal/mole (25° C.) |
|---|---|
| PHE | 2650 |
| TYRO | 2870 |
| ISO | 2970 |
| TRYP | 3000 |

All except HIS as determined by Tanford, J. Am. Chem. Soc. 84:4240–4247 (1962). HIS determined by Nozaki and Tanford, J. Biol. Chem. 246:2211–217 (1971).

Based on the Q-value rule, a peptide with a Q-value above 1400 was expected to be bitter, a peptide with a Q-value below 1300 was expected to be nonbitter, and a peptide with a Q-value between 1300 and 1400 could be either way. Sensory results mostly agreed with this rule. Exceptionally, the debittered 2216-S and 2216, with the Q-values less than 1300 tested trace of to slight bitterness. This could have been caused by the complex effects of other unpalatable flavors, e.g., the brothy and scorched characteristics.

EXAMPLE 3—HYDROPHOBICITY PROFILE

Reverse phase high-performance liquid chromatography (RP-HPLC) was performed using an Astec C18 RP-HPLC column (150×4.6 mm) (Astec Inc., Whippany, N.J.) operated at room temperature with a UV detector set a 220 nm. A linear gradient of 0.1% (v/v) trifluoroacetic acid/95% acetonitrile was employed, using a flow rate of 0.8 ml/min. The gradient program was as follows: 0–5 minutes, water; 5–60 minutes, 0–40% acetonitrile; 60–70 minutes, 40–60% acetonitrile.

Figure 1B:
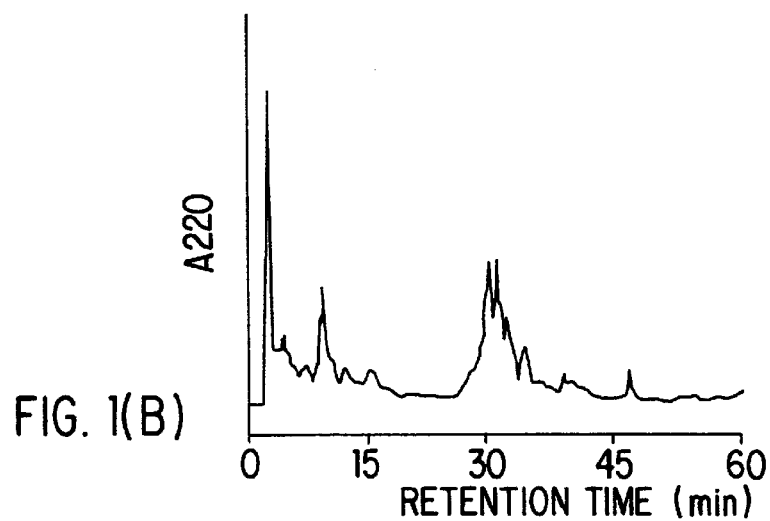
Figure 1C:
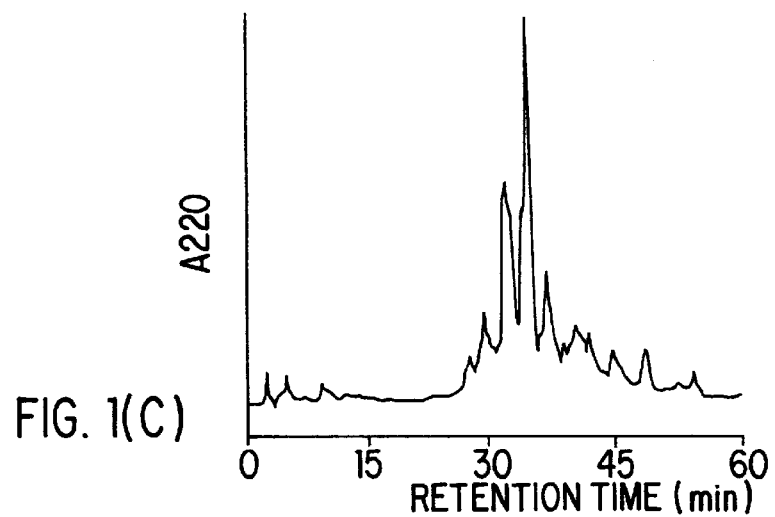
Figure 2A:
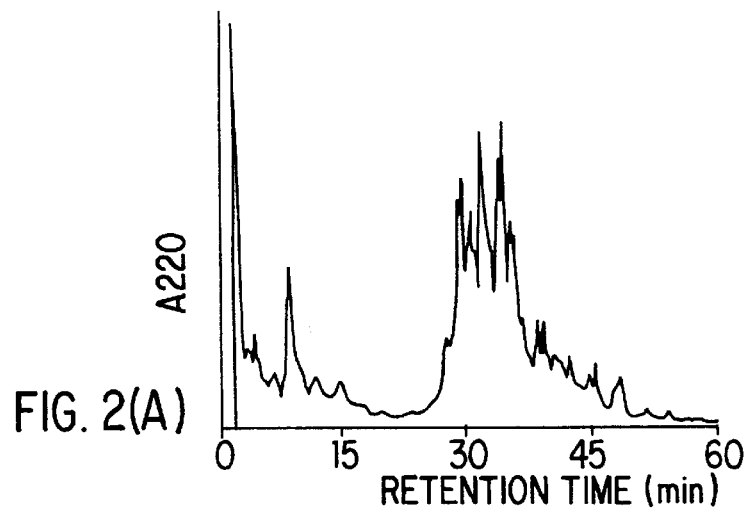
FIG. 2 shows the RP-HPLC profiles of a protein hydrolysate, 2216-S, debittered using C8, the debittered fraction and the bitter fraction.
Figure 2B:
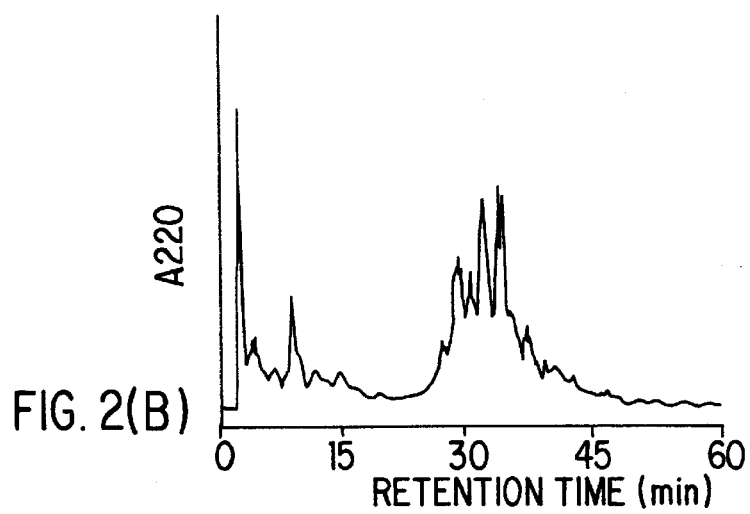
Figure 2C:
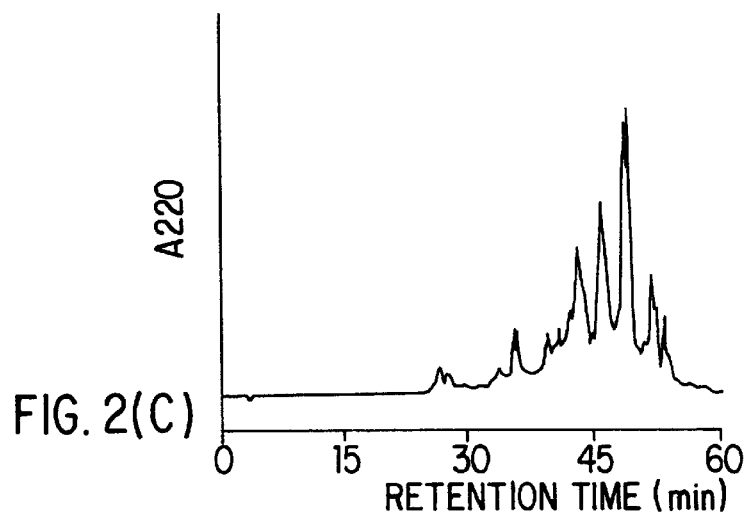
Figure 3A:
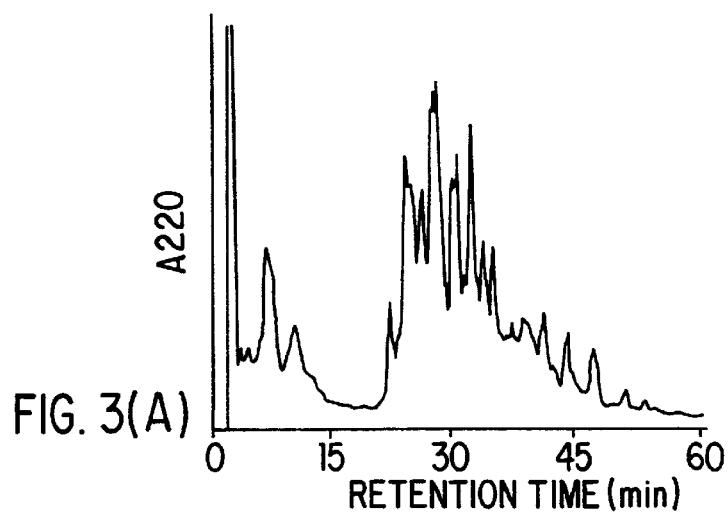
FIG. 3 shows the RP-HPLC profiles of a protein hydrolysate, 2216-S, by a phenolic resin, the debittered fraction and the bitter fraction.
Figure 3B:
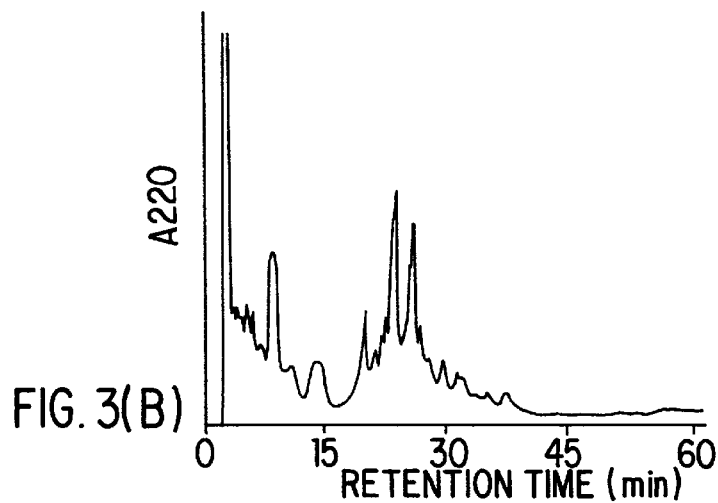
Figure 3C:
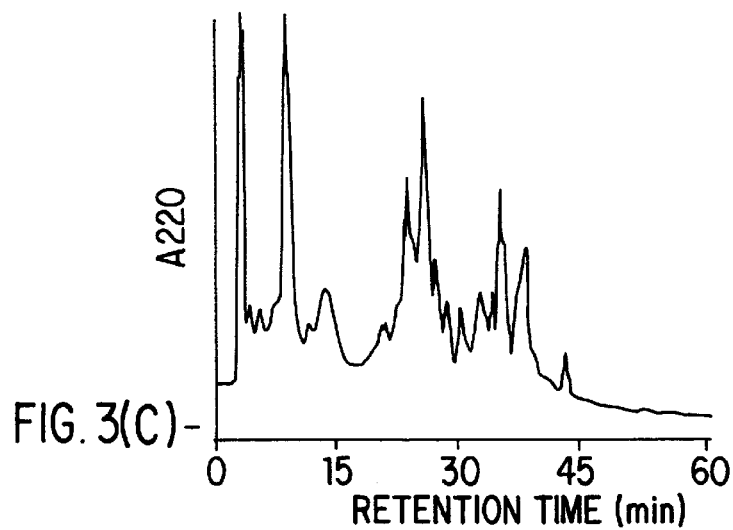

In each of FIGS. 1–3, trace (A) represents the original, bitter hydrolysate; trace (B) represents the debittered fraction; and trace (C) reprsents the bitter fraction. As can be seen from a comparison of FIGS. 1–3, the RP-HPLC profiles of the 2216-S hydrolysate (FIGS. 1, 2, and 3) demonstrated that each of the C18 and PR columns were capable of removing a larger range of hydrophobic peptides than the C8 column, which could only remove very strong hydrophobic peptides. The profile of the PR column in FIG. 3 discloses that it removed hydrophilic peptides as well as hydrophobic peptides. This also resulted in a poor yield of non-bitter product as can be seen in Table I. Furthermore, the evaluation showed that the required length of the PR column should be longer than 75 cm to effectively separate hydrophilic and hydrophobic peptides. This would be a further disadvantage for the use of a phenolic resin in a commercial debittering process, since longer columns would be required, resulting in lower flow rates.

EXAMPLE 4—ANTIGENICITY

Antigenicity is the measure of an ability of a molecule to interact with an immunologically specific antibody. This interaction can stimulate an allergic response, since interaction with antibodies is required. A term related to antigenicity is allergenicity, the capacity of molecules (allergens) to initiate specific allergenic responses. Allergic responses are caused by substances which exhibit a high allergenic reactivity. While antigenicity and allergenic reactivity are related, they are not one and the same. For example, while all allergic responses are caused by antigens, not all antigens stimulate an allergic response. Possibly of greater importance from a practical standpoint is the fact that while the allergenic reactivity of a substance is relatively difficult to measure, it is easier to measure antigenicity.

Given the concern with food allergies, it would be desirable to lower the antigenicity of the hydrolysates associated with this invention. By lowering antigenicity, the allergenic reactivity of the processed hydrolysate would be reduced as well. Ways to lower antigenicity include boiling, denaturation by non-ionic detergents or urea, or hydrolysis. Boiling is not the preferred choice since it does not completely remove antigenic character. Denaturation by non-ionic detergents or urea by definition can cause problems when used around food or for food products. Thus, hydrolysis is the preferred method for lowering antigenicity. Additionally, hydrolysis which destroys the cross-linking ability of an allergen may be sufficient to eliminate its allergenic reactivity. There are several types of hydrolysis, including acid hydrolysis, base hydrolysis, hydrolysis which utilizes purified enzymes, and hydrolysis which utilizes any of a number of commercially available enzyme extracts or mixtures thereof. Unfortunately, moderate to extensive hydrolysis of most proteins generates peptides which are bitter. The bitter flavor of these hydrolysates, which may be extreme, limits their utility.

Given the potential adverse affects associated with hydrolysis, it was decided to test the method and product associated with this invention to ascertain whether antigenicity was effected. It was very important to be sure that the method of this invention would not disrupt the hypoallergenic character of the material. Something that is hypoallergenic displays a low allergenic reactivity. Specifically, a hypoallergenic food is one that has been shown, with a 95% confidence level, not to cause allergic reactions in 90% of patients who are known to be allergic to the parent food. With respect to this invention, if debittering the hydrolysates damaged the hypoallergenicity of the product, then the method of this invention and its end product still might not be acceptable due to concerns relating to food allergies.

Immunologically active casein (IAC) and immunologically active whey protein (IAW) were defined by referring to the unhydrolyzed casein and unhydrolyzed whey protein, respectively, using an inhibition enzyme-linked immunosorbent assay (ELISA) as described by Mahmoud et al., *J. Food Sci.*, 57: 1223–1229 (1992). Casein antigen solutions at 10, 30, 100, 300, 1000, and 3000 ng/mL, prepared by using intact casein, were used to establish a standard curve by plotting logit of % inhibition of the ELISA signal (A/Ao) vs. logarithm of casein concentration. Hydrolysate casein antigen concentrations were determined by reference to the standard curve.

As can be appreciated from Table III as set forth below, the immunological active casein protein was greatly reduced in C8 and C18 debittered hydrolysates.

TABLE III

Antigenicity properties of hydrolysates before and after debittering

| Sample | μg IAC/g protein | μg IAW/g protein |
|---|---|---|
| Intact casein | 607100 | 68800 |
| ACH2 Original | 12980 | 747 |
| C18 Treated | 3250 | 341 |
| 2216-S Original | 6.9 | 9.17 |
| C8 Treated | 5.67 | 8.05 |
| C18 Treated | 2.85 | 6.60 |
| 2216 Original | 3.85 | 6.62 |
| C8 Treated | 2.45 | 7.25 |
| C18 Treated | 1.25 | 6.15 |

These numbers demonstrate that antigenic properties of the debittered protein hydrolysates, instead of being adversely affected, were unexpectedly lowered substantially. For example, the number goes from over 600,000 in the intact material to 12,000–13,000 in the original ACH2 protein hydrolysate, to just over 3,000 in the C18 treated hydrolysate. Meanwhile, in the 2216-S protein hydrolysate, the initial value is only 6.9. Using C8 reduced the number slightly to 5.67, however using C18 reduced it all the way to 2.8. Thus the immunologic reactivity of the debittered C18 hydrolysate has been substantially reduced. Therefore, it can be appreciated that processing of the protein hydrolysates tested in connection with this invention with C18 significantly improves the hypoallergenicity of the product.

Thus, there are an additional two advantages associated with the method of this invention, both of which have to do, not with the debittering of the protein hydrolysate, but with the decreasing of the protein hydrolysate's allergenic reactivity. The first advantage is that the method of this invention unexpectedly permits an extensively hydrolyzed protein to have its allergenic reactivity significantly decreased at the same time it is being made less bitter. The second advantage is that the method of this invention permits a protein hydrolysate which has not been rendered hypoallergenic to be treated such that the resulting processed protein hydrolysate is hypoallergenic.

EXAMPLE 5—AMINO ACID COMPOSITION

It was thought that the amino acid composition might account for part of the effect in reducing the antigenicity of the casein hydrolysates. In order to explore the relationship between the reduction of antigenicity and the change of amino acid profile of debittered hydrolysates, the amino acid composition of hydrolysates were determined on samples subjected to acid hydrolysis (Moore et al, *Methods of Enzymology*, 6: 819–831 (1963)), performic acid oxidation for determining cystine and methionine (Moore, *J. Biol. Chem.*, 238: 235–237 (1963)), and basic hydrolysis for determining tryptophan (Hugli et al, *J. Biol. Chem.*, 247: 2828–2834 (1972)). Sample analysis was performed on a Dionex 2000i amino acid analyzer with a high-performance ion exchange column, specifically a HPICE-AS4 polystyrene sulfonic acid resin column, and ninhydrin detection system.

As shown below in Table IV below, it was found that there was a similar amino acid profile between and among each category. The amino acid composition profiles demonstrated a notable reduction in the contents of proline, phenylalanine and tyrosine, which are recognized as strong hydrophobic amino acids, by the C18 and PR columns in each hydrolysate species, but not by the C8 column. This may help to explain the retained bitter taste of C8-debittered products.

TABLE IV

The comparison of amino acid compositions between original hydrolysates and debittered products by the different columns.

| Sample | ACH2 | | | | 2216-S | | | | 2216 | | |
|---|---|---|---|---|---|---|---|---|---|---|---|
| A.A.¢in. | Ori. | C18 | C8 | PR | Ori. | C18 | C8 | PR | Ori. | 18 | C8 |
| CYS | 0.4 | 0.4 | 0.2 | 0.3 | 0.3 | 0.8 | 0.2 | 0.4 | 0.6 | 0.6 | 0.4 |
| NH$_3$# | 1.7 | 1.9 | 1.7 | 2.3 | 1.9 | 2 | 1.6 | 2.2 | 1.9 | 1.9 | 1.6 |
| GLY | 1.7 | 1.8 | 1.7 | 1.9 | 1.9 | 1.9 | 1.9 | 2.1 | 2.7 | 2.5 | 2.6 |
| SER | 4.6 | 5.8 | 5.1 | 7.4 | 6 | 6.8 | 6.3 | 7.7 | 5.9 | 6.2 | 6 |
| THRE | 4 | 4.8 | 4.3 | 5.8 | 4.7 | 5.8 | 4.8 | 6.1 | 4.7 | 5 | 4.9 |
| HIS | 3.2 | 2.2 | 3.1 | 0.9 | 3.3 | 3.2 | 3.3 | 1.1 | 3.1 | 2.9 | 3 |
| ASP | 6.6 | 8.5 | 7 | 9.5 | 7.2 | 8.4 | 7.5 | 9.3 | 7.9 | 8.1 | 8 |
| GLU | 17.9 | 21.5 | 18.8 | 21.7 | 17.9 | 20.1 | 20.4 | 21.7 | 17.8 | 18.9 | 19.4 |
| (ARG)* | 3.4 | 3 | 3.4 | 2.2 | 2.3 | 2.2 | 2.2 | 1 | 4.1 | 4.6 | 4.2 |
| ALA | 2.9 | 3.9 | 3.2 | 4 | 3.3 | 3.5 | 3.4 | 3.7 | 3.8 | 4.2 | 3.9 |
| METH | 3.8 | 3.3 | 3.2 | 2.7 | 3.2 | 3.5 | 1.3 | 3.2 | 3 | 3.5 | 1.5 |
| LYS | 8 | 8.9 | 7.8 | 8.6 | 8.3 | 9.4 | 8.6 | 7.1 | 8.3 | 9 | 8.7 |
| (VAL) | 6.5 | 5.9 | 5.5 | 6.1 | 5.8 | 6.1 | 5.8 | 6.6 | 6.3 | 6.7 | 6.2 |
| (LEU) | 9.7 | 9.2 | 8.9 | 9 | 8.2 | 8.6 | 8.5 | 9.5 | 8.2 | 9.3 | 8.4 |
| PRO | 9.2 | 6.2 | 9.6 | 6.8 | 9.8 | 4.9 | 9 | 5.8 | 9.4 | 7.1 | 8.8 |
| (PHE) | 5.2 | 2.9 | 4.8 | 1.8 | 4.5 | 2.9 | 4.2 | 1.8 | 4.4 | 3 | 4.4 |
| (TYRO) | 5.9 | 4.7 | 5.7 | 3.8 | 52 | 4.1 | 4.4 | 4 | 1.6 | 1.2 | 1.4 |
| (ISO) | 4.8 | 4.7 | 4.7 | 4.9 | 5.3 | 5.5 | 5.5 | 6.2 | 5.4 | 5.3 | 5.5 |
| (TRYP) | 0.5 | 0.3 | 1.1 | 0.3 | 0.9 | 0.3 | 1.1 | 0.2 | 1 | 0.1 | 1.2 | free amino groups

*(): bitter amino acids

The decrease (%) of each amino acid residue due to the debittering process can be determined by the following equation:

$$Dij = \frac{Cbij - Caij \times Yj}{Cbij}$$

where Dij was the decrease (%) of a given amino acid residue, i., during the process, j; Cbij and Caij were the compositions of a given amino acid, i, in a given hydrolysate before and after the process, j, respectively; and Yj was the yield of debittered product in the process, j. The Dij value, if larger than (I-Yj), represented the significant removal by the debittering process.

Figure 4:
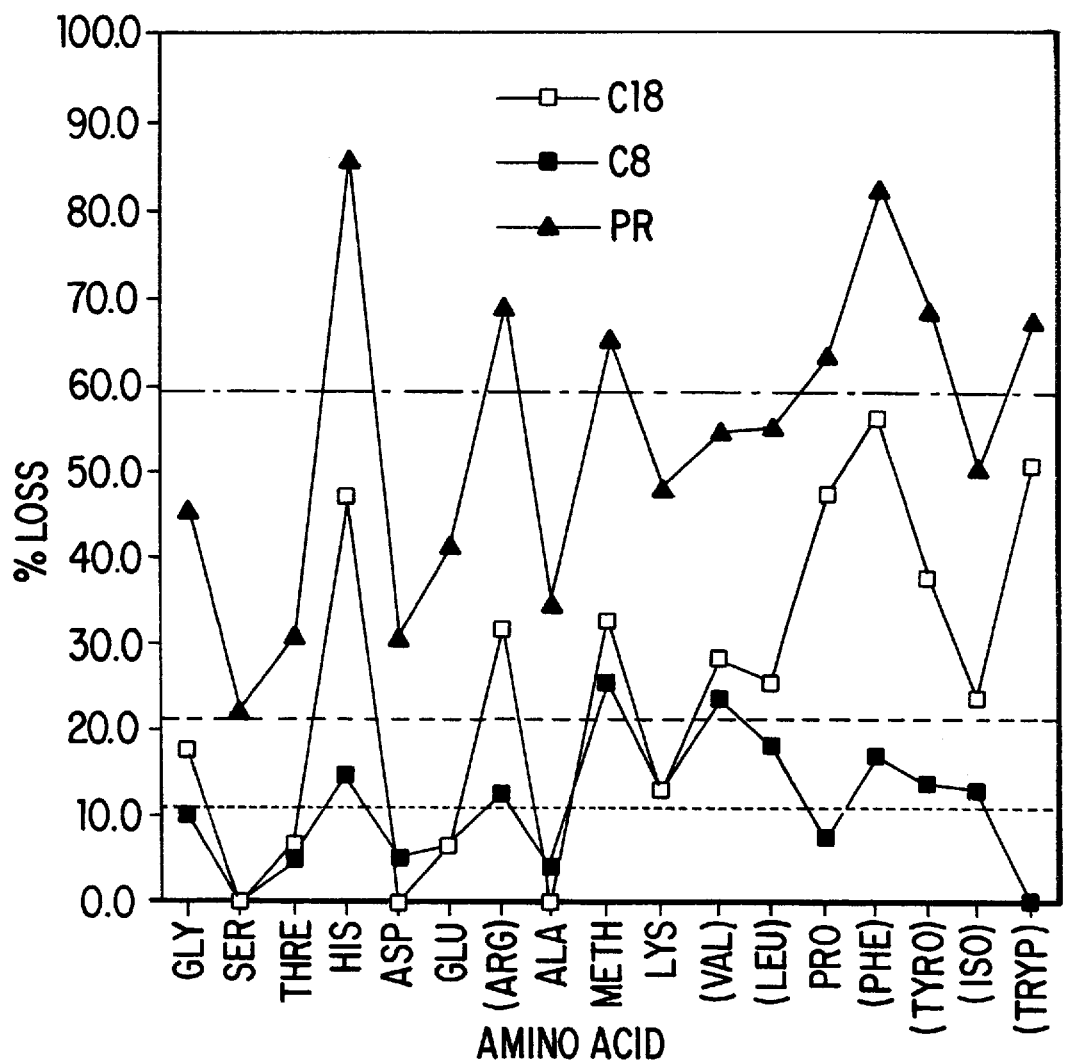
FIG. 4 is a profile showing the % loss in amino acids in the debittering of a protein hydrolysate, ACH2.
Figure 5:
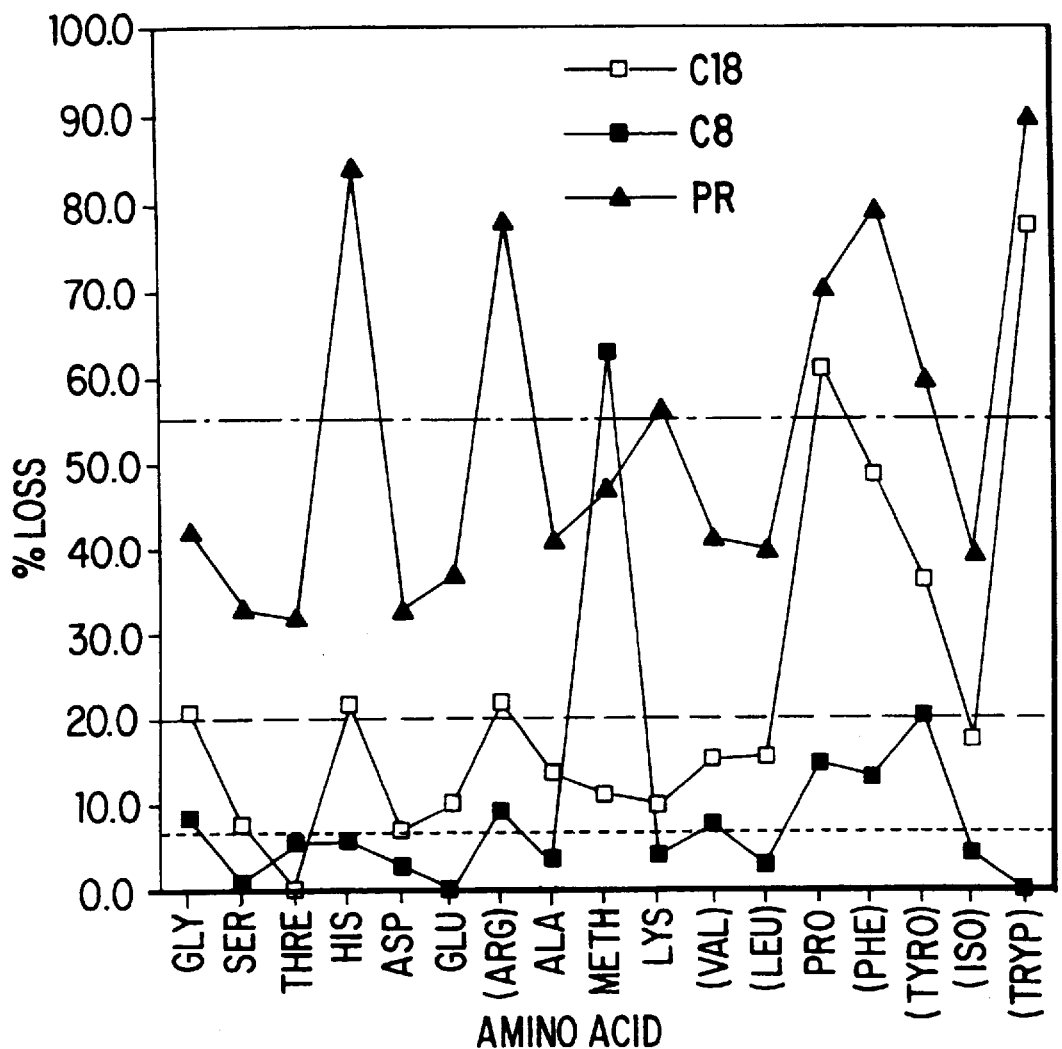
FIG. 5 is a profile showing the % loss in amino acids in the debittering of a protein hydrolysate, 2216-S.
Figure 6:
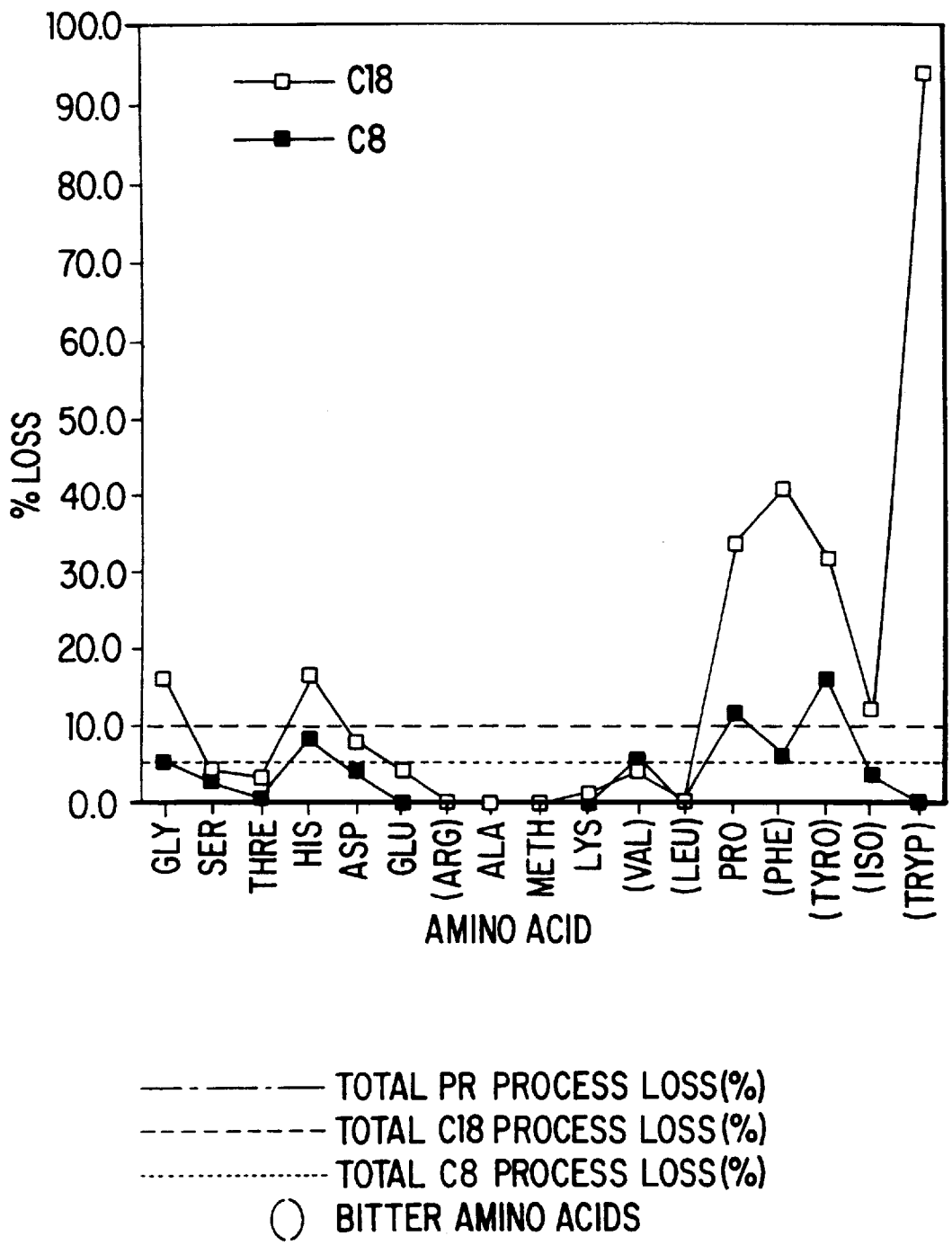
FIG. 6 is a profile showing the % loss in amino acids in the debittering of a protein hydrolysate, 2216.

As can be seen from a comparison of FIGS. 4–6, the C18 and PR columns had a similar tendency to significantly remove histidine, arginine, proline, tyrosine, phenylalanine, and tryptophan, even though histidine and arginine are recognized as hydrophilic amino acids. According to the studies concerning BPla (Arg-Gly-Pro-Pro-Phe-Ile-Val) and BPIc (Val-Tyr-Pro-Phe-Pro-Pro-Gly-Ile-Asn-His), it was concluded that two determinant sites participated in the mechanism for the bitter taste of peptides: the primary one a hydrophobic group, and the secondary one, another hydrophobic group or a bulky basic group. Moreover, arginine, proline and hydrophobic amino acids have been found to exhibit a strongly bitter taste. The removal of histidine and arginine are believed to be explainable. First it must be remembered that this invention is directed to the removal of peptide groups and not to individual amino acids, and as such it is believed that the removal of histidine and arginine can be attributed to having occurred within the hydrophobic peptides. Second, under the normal conditions of this process, where the pH is neutral, histidine is not charged, and as such would not act hydrophilic. Third, due to the additional double bond in arginine, it does not display all the characteristics of classic hydrophilic amino acids.

Of course, ideally it would be desirable to completely debitter the hydrolysate, but not lose any amino acids. Such a thing is obviously impossible because the peptides giving rise to the bitterness are comprised of amino acids. What FIGS. 4–6 disclose is that with the hydrolysates tested, fewer amino acids are lost with the C18 treatment than with the phenolic resin treatment. This makes C18 superior to the phenolic resin approach. Based on the graphs alone, C18 is not superior to C8 because hardly any of the hydrophobic residues are lost with the C8 process. However, there is the problem with the C8 process and that hydrolysate, in that the debittered fraction is still bitter.

The graphs of FIGS. 4–6 also disclose what amino acids might need to be added back, for example, using the phenolic resin process with ACH2 would require HIS, ARG and METH to be added back. Of course, it must be remembered that what is being removed typically are not free amino acids, but peptides that contain those amino acids. However, to get back to the original nutritional value without imparting bitterness, just the free amino acids could be inserted. For example, if 2216 is treated with C18, then tryptophan must be added back. However, as has been discussed above, the bitter fraction can be subjected to further hydrolysis and free amino acids can be recovered, and then added back to the debittered hydrolysate. That way the bitter fraction can become a source for some of the amino acids that need to be added back.

Industrial Applicability

While the yield associated with the phenolic resin process was relatively low, the yield associated with the method of this invention is quite acceptable as shown in Table I. The % yield (Y) of debittered product was defined as the ratio of total nitrogen content in the processed product to that in the original material. The nitrogen content of the hydrolysates was determined by micro-Kjeldahl analysis (Labconco 65000 rapid distillation unit., Labconco Corp., Kansas City, Mo.).

Thus it can be appreciated that C18 columns were highly effective in removing the bitterness from a broad range of protein hydrolysates. The advantages in debittering hydrolysates with C18 columns over other debittering processes, such as chromatographic, flavor-masking, and enzymatic process, can be perceived in several ways. First, the method results in a highly reproducible product in which the bitterness has been removed. Second, there is high productivity due to a high yield and flow rate. Third, there is easy regeneration of the siloxane. Fourth, there is a long life span associated with the siloxane columns. Fifth, there is the ability to reduce the antigenicity of the hydrolysate without significantly changing the amino acid profile or nutritional value. This substantially improves the quality of the processed hydrolysate for food applications and especially for hypoallergenic food applications. Sixth, the debittered protein hydrolysate can be incorporated into a variety of food products, both solid and liquid. Such food products preferably include a source of fats and a source of carbohydrates.

Seventh, the type of hydrolysis is not important, although from a cost consideration it is advantageous that this method and product can use a commercial enzyme extract mixture.

There also may be use for this invention in pharmaceuticals. For example, there are some products where a protein hydrolysate is already a preferred carrier. Additionally, there are pharmaceuticals for controlling food allergies. Finally, there are people who are allergic to a carrier, so that the use of a hydrolysate is desirable. In all these cases, the ability to use a hydrolysate with a reduced antigenicity is advantageous.

While the debittered and more hypoallergenic protein product and more particularly the method for recovery of the debittered and more hypoallergenic protein product herein described constitute preferred embodiments of the invention, it is to be understood that the invention is not limited to this precise form of product and method and that changes may be made therein without departing from the scope of the invention which is defined in the appended claims.

What is claimed is:

1. A method for debittering protein hydrolysates comprising:

providing an aqueous solution of a protein hydrolysate, said protein hydrolysate being sufficiently hydrolyzed to exhibit bitterness, said protein hydrolysate comprising a bitter fraction and a non-bitter fraction;

applying said solution to a bed of siloxane wherein the alkyl chain of said siloxane is 18 or more carbon atoms; and collecting a portion orsaid solution which does not bind to said siloxane to obtain the debittered protein hydrolysate.

2. The method of claim 1 wherein said siloxane is octadecyl-siloxane.

3. The method of claim 1 wherein said protein hydrolysate is derived from animal protein.

4. The method of claim 3 wherein said protein hydrolysate is derived from animal protein selected from the group consisting of casein and whey.

5. The method of claim 1 wherein said protein hydrolysate is derived from vegetable protein.

6. The method of claim 5 wherein said protein hydrolysate is derived from soy.

7. The method of claim 1 wherein said debittered protein hydrolysate has a lower antigenicity or lower allergenic reactivity than said protein hydrolysate.

8. The debittered protein hydrolysate product produced in accordance with the process of claim 1.

9. The product of claim 8 wherein said protein hydrolysate is derived from animal protein.

10. The product of claim 8 wherein said protein hydrolysate is derived from vegetable protein.

11. The product of claim 8 wherein said protein hydrolysate is selected from the group consisting of casein, whey, and soy proteins.

12. The product of claim 8 further comprising fats and carbohydrates.

13. The product according to claim 8 wherein said debittered protein hydrolysate has a lower antigenicity or allergenic reactivity than said protein hydrolysate.

14. A method for decreasing the allergenic reactivity of protein hydrolysates comprising:

providing an aqueous solution of a protein hydrolysate, said protein hydrolysate being sufficiently hydrolyzed to exhibit allergenic reactivity, said protein hydrolysate comprising an allergenic fraction and another fraction;

applying said solution to a bed of siloxane wherein the alkyl chain of said siloxane is 18 or more carbon atoms, and collecting a portion of said solution which does not bind to said siloxane to obtain a protein hydrolysate having a lower allergenic reactivity than said protein hydrolysate.

15. The method of claim 14 wherein said siloxane is octadecyl-siloxane.

16. The method of claim 14 wherein said protein hydrolysate is derived from animal protein.

17. The method of claim 14 wherein said protein hydrolysate is derived from vegetable protein.

18. The method of claim 14 wherein said protein hydrolysate is selected from the group consisting of casein, whey and soy proteins.

19. A method for fractionating a protein hydrolysate having a bitter fraction and a non-bitter fraction, said method comprising:

providing an aqueous solution of a protein hydrolysate, said protein hydrolysate being sufficiently hydrolyzed to exhibit bitterness, said protein hydrolysate comprising a bitter fraction and a non-bitter fraction;

applying said solution to a bed of siloxane wherein the alkyl chain of said siloxane is 18 or more carbon atoms; and collecting at least one of: (i) a portion of said solution which does not bind to said siloxane to obtain the non-bitter fraction, or (ii) a portion of said solution which bound to said siloxane to obtain the bitter fraction.

20. The method of claim 19 wherein said siloxane is octadecyl-siloxane.

21. The method of claim 19 wherein said protein hydrolysate is selected from the group consisting of casein, whey and soy proteins.

* * * * *